July 18, 1967 JEAN-MARIE JOLLOIS 3,332,002

VARIABLE FREQUENCY TO CONSTANT FREQUENCY CONVERTERS

Filed Oct. 21, 1963 6 Sheets-Sheet 1

INVENTOR

JEAN-MARIE JOLLOIS

BY Bailey, Stephens & Huettig

ATTORNEYS

VARIABLE FREQUENCY TO CONSTANT FREQUENCY CONVERTERS

Filed Oct. 21, 1963 6 Sheets-Sheet 2

INVENTOR
JEAN-MARIE JOLLOIS
BY Bailey, Stephens & Huettig
ATTORNEYS

July 18, 1967 JEAN-MARIE JOLLOIS 3,332,002

VARIABLE FREQUENCY TO CONSTANT FREQUENCY CONVERTERS

Filed Oct. 21, 1963 6 Sheets-Sheet 3

INVENTOR
JEAN-MARIE JOLLOIS
BY Bailey, Stephens & Huettig
ATTORNEYS

INVENTOR
JEAN-MARIE JOLLOIS
BY Bailey, Stephens & Huettig
ATTORNEYS

INVENTOR.
JEAN-MARIE JOLLOIS
BY Bailey, Stephens & Huettig
ATTORNEYS

VARIABLE FREQUENCY TO CONSTANT FREQUENCY CONVERTERS

Filed Oct. 21, 1963

INVENTOR
JEAN-MARIE JOLLOIS
BY Bailey, Stephens & Huettig
ATTORNEYS

United States Patent Office 3,332,002

Patented July 18, 1967

3,332,002

VARIABLE FREQUENCY TO CONSTANT FREQUENCY CONVERTERS

Jean-Marie Jollois, Courbevoie, France, assignor to La Precision Mecanique Labinal, Saint-Ouen, Seine, France, a society of France Filed Oct. 21, 1963, Ser. No. 317,681
Claims priority, application France, Oct. 26, 1962, 913,631
6 Claims. (Cl. 321—61)

The present invention relates to frequency changers, in particular for changing the frequency to a lower value. It is more especially concerned with devices for deducing from a first alternating voltage of variable frequency a second alternating voltage of uniform frequency lower than the lowest value of said variable frequency.

The chief object of the present invention is to provide a device of this kind having, over the prior devices used for the same purpose, the advantages of a particularly constant value of the frequency of the second voltage and of a practically complete absence of harmonics in this voltage at uniform frequency.

The present invention has for its object a frequency changer comprising, on the one hand, controlled rectifiers (preferably of the solid thyratron type) which connect, preferably through low-pass filters eliminating the harmonics of the lower frequency, an output at the lower frequency with the three positive alternations of a three-phase network at the higher frequency and with the three negative alternations of said network, alternating so as to produce a positive alternation and a negative alternation of the lower frequency and, on the other hand, means for controlling the angle for which the controlled rectifiers are conductive, in such manner as to cause said angle to increase gradually at the beginning of every low frequency alternation, to keep it at a value corresponding to full conduction for the middle portion of every low frequency alternation and to cause it to decrease gradually to zero at the end of every low frequency alternation, this device being characterized in that it comprises a system for gradually controlling the rectifiers comprising, for every phase, in combination, means for producing a succession of signals at the lower frequency comprising successively for every alternation, an increasing portion, a substantially constant portion and a decreasing portion, in absolute value, means for producing a succession of signals at the input frequency consisting of saw teeth of constant amplitude, a charging network of the resistor-capacitor type fed with the succession of higher frequency signals and means, consisting preferably of a single junction transistor, for comparing the two successions of signals and capable, every time the charge of said network reaches a value which is in a given linear relation to the value of the signal at lower frequency at the same time, of discharging the charging network and of supplying a pulse which serves to operate a controlled rectifier of said phase.

The present invention is particularly intended for use on a vehicle, and in particular an aircraft.

Preferred embodiments of the present invention will be hereinafter described with reference to the appended drawings, given merely by way of example, and in which:

FIG. 1 diagrammatically shows a frequency changer, including controlled rectifiers and low-pass filters, to which the improvements according to the invention may be applied;

Figures 3, 5:
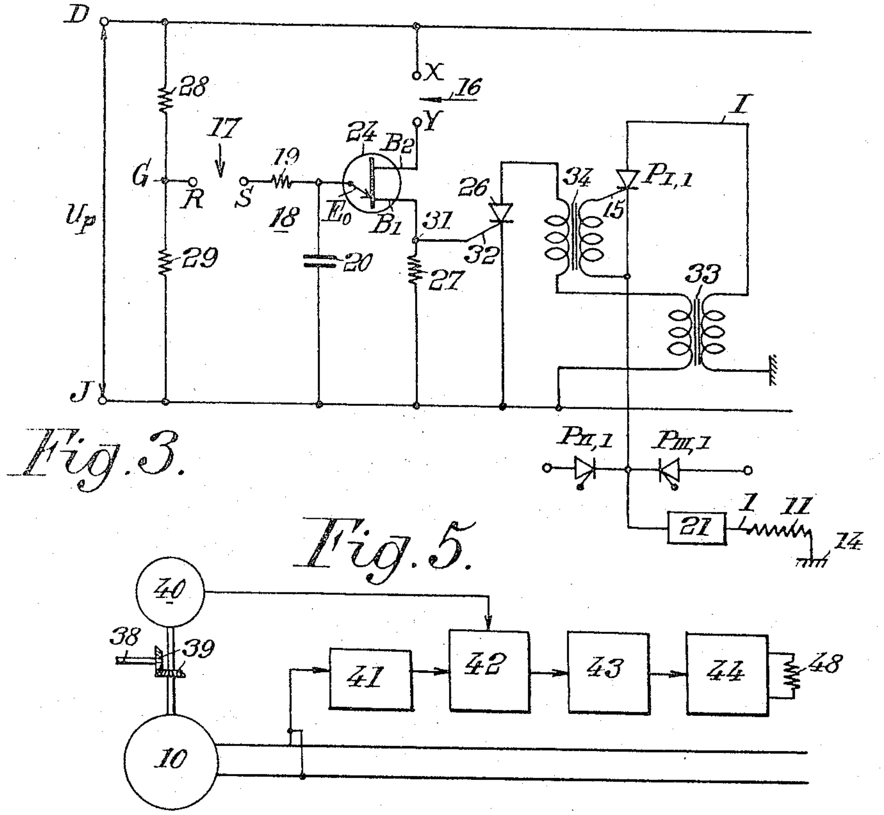
FIG. 3 is a general diagrammatical view of the preferred embodiment of the means according to the invention for controlling the rectifiers corresponding to one phase.
Figure 6:
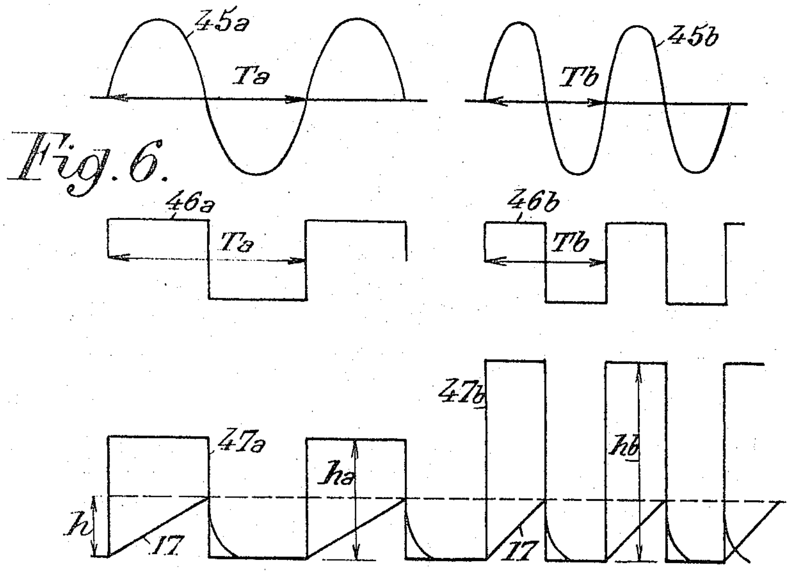
Figure 7:
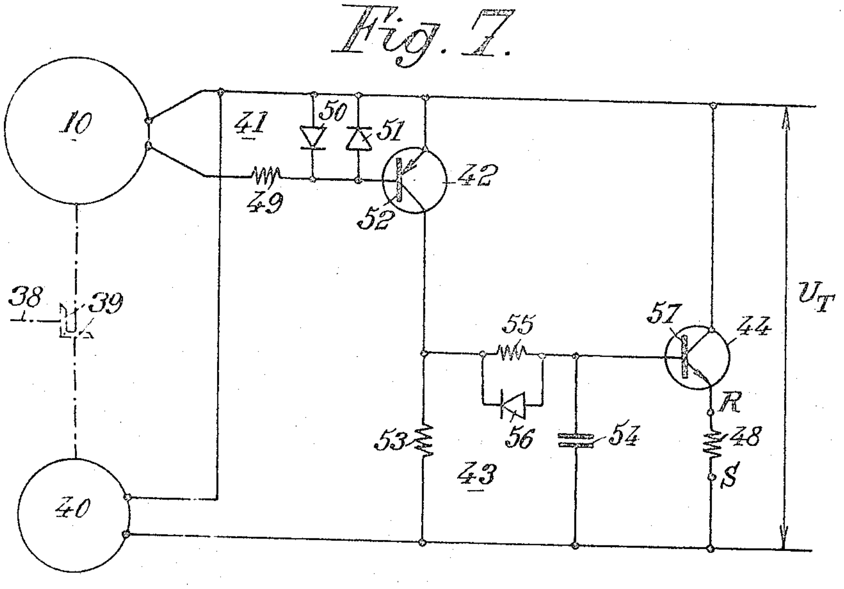
Figure 8:
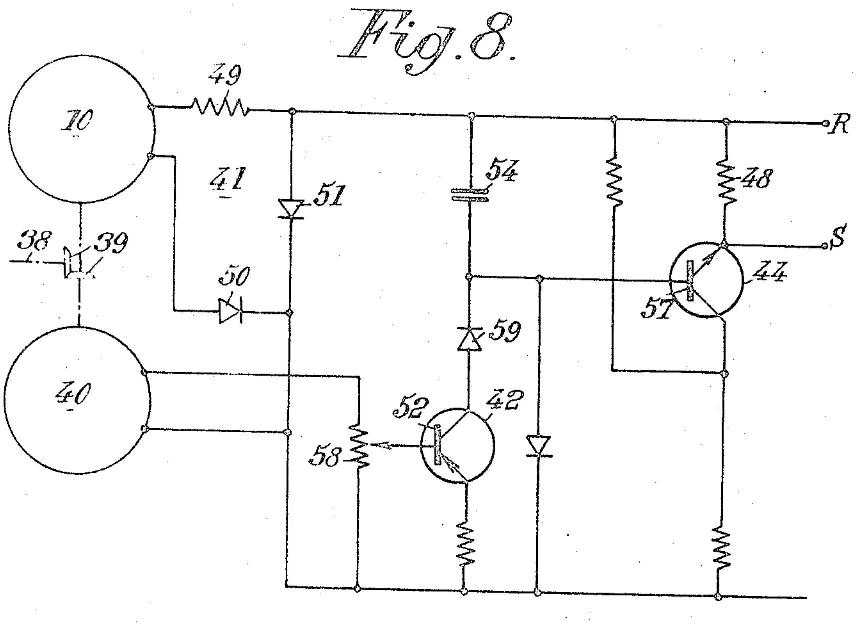
Figure 8A:
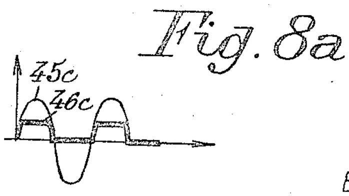
Figures 9, 10, 11:
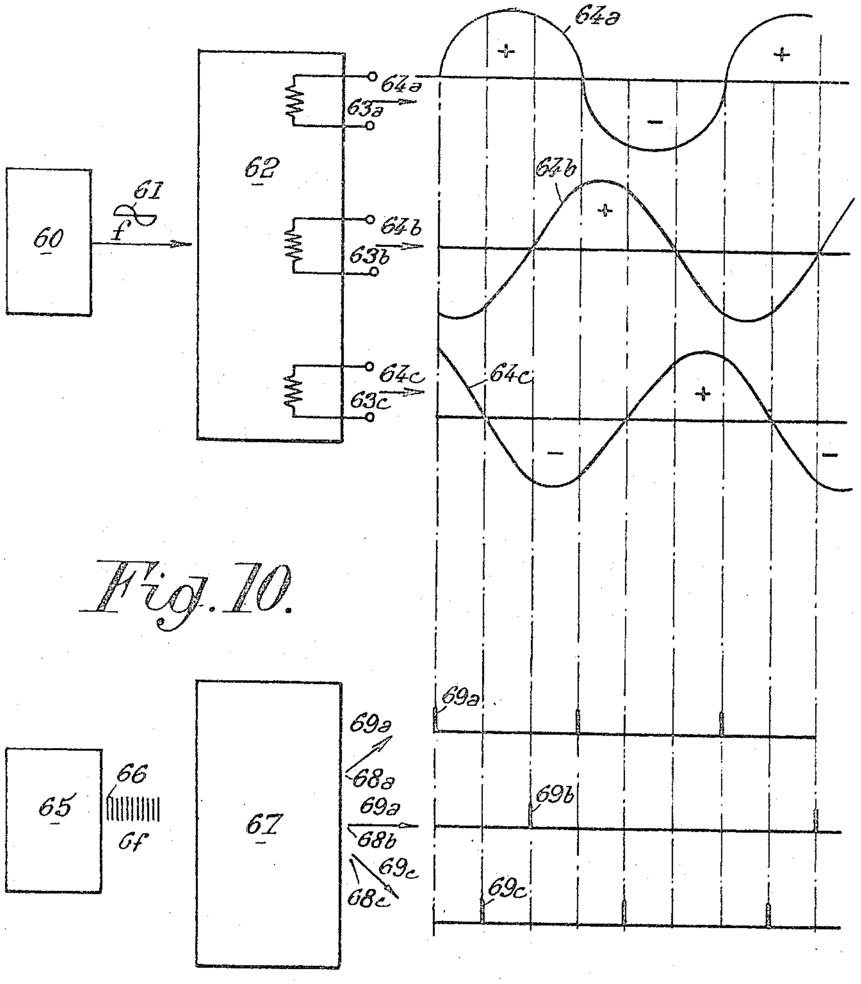
Figures 12, 13, 14, 15, 16:
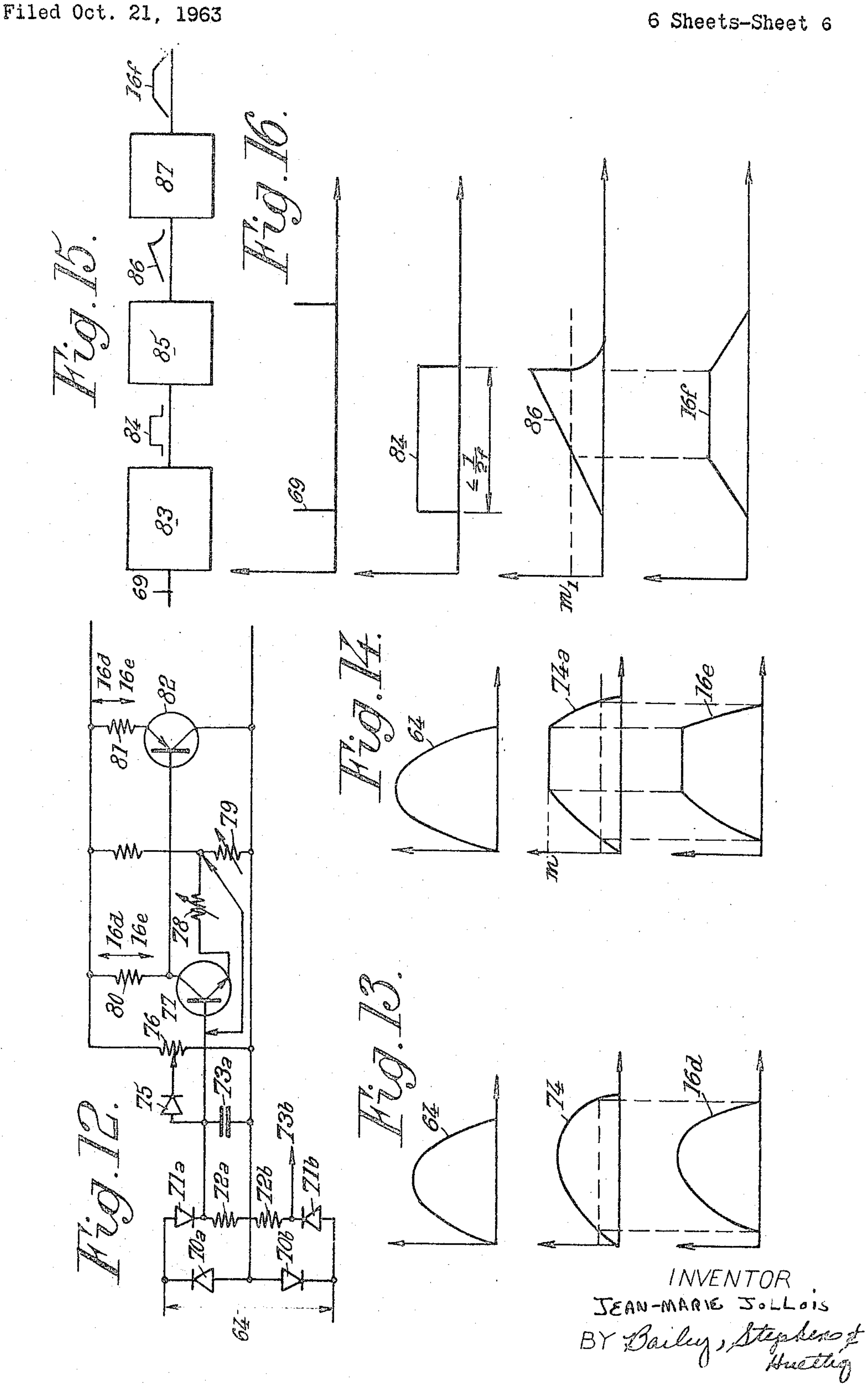

FIG. 5 diagrammatically shows the circuit for producing the saw teeth of constant amplitude which constitute the signals at higher frequency applied on one of the terminals of the device of FIG. 3;

FIG. 6 shows waveforms brought into play in the circuit of FIG. 5;

FIGS. 7 and 8 show two particular embodiments of the diagrammatic circuit of FIG. 5;

FIG. 8*a* illustrates the action of a peak limiter provided in the device of FIG. 8;

FIGS. 9 and 10 show two embodiments of circuits for supplying reference signals capable of controlling two types of means for producing the succession of signals at lower frequency;

FIG. 11 shows the waveforms and the pulses obtained respectively in the embodiments of FIGS. 9 and 10;

FIG. 12 shows an embodiment of a circuit for transforming the waveforms obtained in the circuit of FIG. 9 into a succession of signals at the lower frequency;

FIGS. 13 and 14 show the waveforms used in the circuit of FIG. 12 for two different adjustments thereof;

FIG. 15 shows a type of circuit capable of producing the succession of signals at lower frequency from the pulses supplied by the circuit of FIG. 10;

FIG. 16 shows the electrical signals used in the circuit of FIG. 15.

According to the present invention it is desired, for instance, to provide a device which deduces, from a first three-phase reciprocating voltage of variable frequency, a second three-phase, or single-phase, reciprocating voltage of a uniform frequency smaller than the smallest value of said variable frequency.

Figure 1:
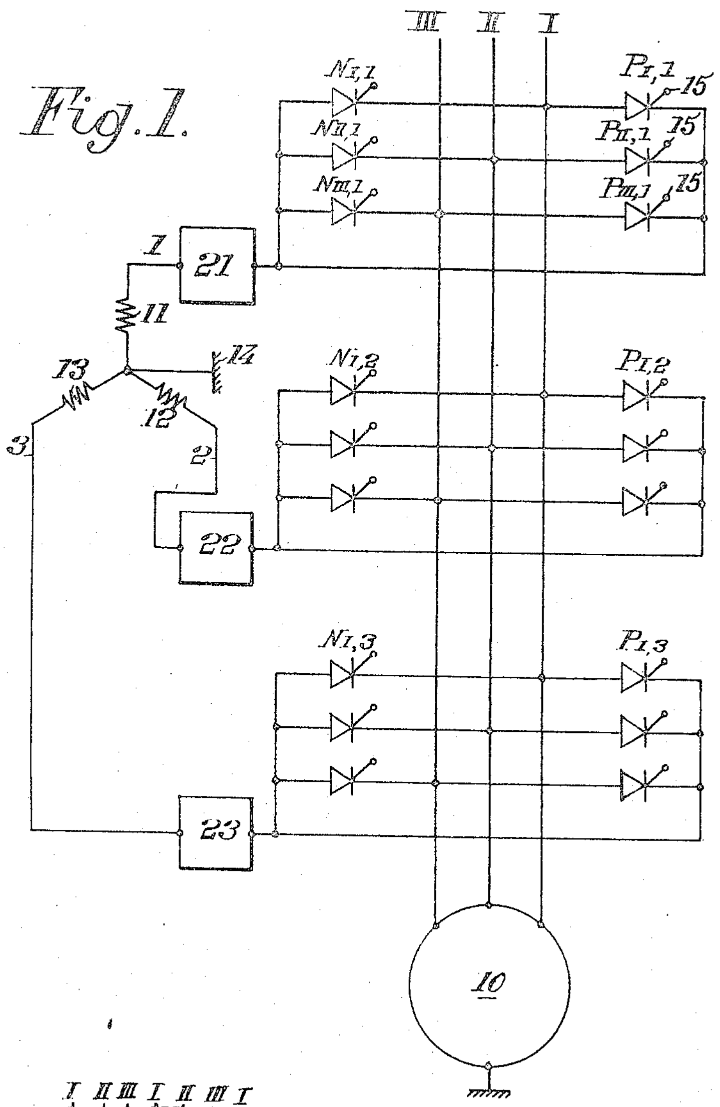

FIG. 1 shows a three-phase alternator 10 driven at variable speed (for instance from the shaft of an aircraft turbo-propeller or turbo-jet), which, when its speed is within a given range supplies a three-phase line I, II, III with a voltage of a frequency F ranging between two limit values, a lower one $F_0$ (for instance 1600 Hz.) and a higher one $F_1$ (for instance 3200 Hz.). From this alternator 10, it is desired to obtain a voltage, for instance a three-phase voltage (but it might be a single phase voltage), of fixed frequency *f* (for instance 400 Hz.) lower than $F_0$, this three-phase voltage of frequency *f* being distributed among conductors 1, 2, 3 and used in loads 11, 12, 13, respectively, inserted between said conductors 1, 2, 3 and the ground 14.

In the following description, frequency *f* will also be called "low frequency" or "L.F.," and frequency F will be called "high frequency" or "H.F."

The device for this purpose comprises, in the known manner, the following elements.

On the one hand, for every phase of the output voltage at low frequency *f*, three pairs of controlled rectifiers, the two rectifiers of every pair being mounted in opposition so that every low frequency phase is fed successively from the positive alternations of the high frequency and from the negative alternations thereof (said controlled rectifiers are designated by letters P and N with two indexes, one being a roman numeral designating the phase of the F frequency voltage and the other an arabic numeral designating the phase of the *f* frequency voltage connected therewith). Said rectifiers are preferably solid thyratrons or controlled diodes, for instance silicon thyratrons. They connect, preferably with the interposition of low-pass filters 21, 22, 23, respectively, for cancelling the harmonics of said frequency *f*, a conductor 1, 2 or 3 where the frequency is *f* with the three positive alternations of the three-phase network I, II, III, where the frequency is F, and with the three negative alternations of said network, alternately, so as to produce a low frequency positive alternation and negative alternation, respectively; and On the other hand means for controlling the angle for which controller rectifiers P annd N are conductive, this angle being hereinafter called "conductive angle," so as to cause said angle to increase gradually at the beginning of every $f$ frequency alternation, to keep it at a value corresponding to full conduction for the middle portion of every $f$ frequency alternation, and to cause it to decrease gradually to zero at the end of every $f$ frequency alternation.

Figure 2:
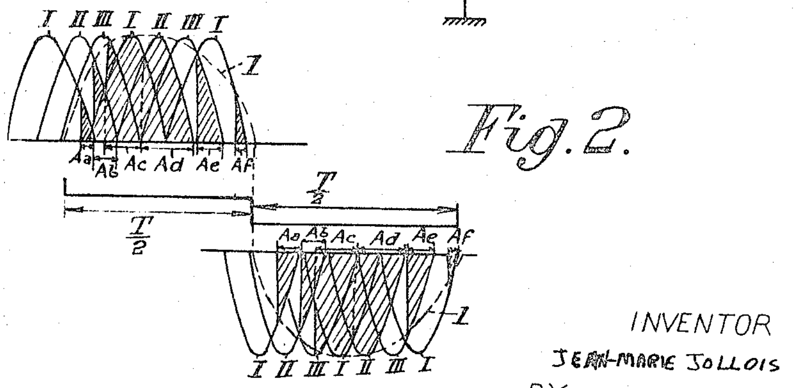
FIG. 2 shows the form of the waves to be obtained, in a device such as that of FIG. 1, by a control device made according to the invention.

FIG. 2 shows, for a positive alternation and a negative alternation of one phase at frequency $f$ (each of these alternations having a length equal to one half of the period T which is equal to $1/f$), the variations of the conduction angle. At the beginning of every alternation conduction angle A increases gradually (it has successively the values $A_a$, $A_b$, $A_c$) which causes a gradual increase of the energy passing through the low frequency phase (for instance the phase corresponding to conductor 1) from the high frequency alternations I, II, III. Then this conduction angle remains substantially constant at a sufficient level $$\left(\text{higher than } A_d \frac{5\pi}{6}\right)$$

to ensure full conduction, and therefore the passage of the maximum of energy, during the middle portion of every alternation of the low frequency. Finally the conduction angle A gradually decreases down to zero (assuming successive value $A_e$, $A_f$ for instance) during the end portion of every low frequency alternation, which causes a gradual decrease of the energy transmitted by the high frequency network to the low frequency phase. In FIG. 2 the cross-hatched portions show the portions of the three-phase high frequency I, II, III transmitted to one low frequency phase during a low frequency period $1/f$ shown in dotted lines.

The harmonics are eliminated, for every low frequency phase by the low-pass filter 21, 22 or 23 so that each of the loads 11, 12 or 13 receives a wave of the type of that shown in dotted lines in FIG. 2.

Considering now both FIG. 1 and FIG. 2, it will be seen that, for the low frequency phase corresponding to conductor 1, a period of this phase corresponds successively to the operation of rectifier $P_{I,1}$ for a conduction angle $Aa$, of rectifier $P_{II,1}$ for a conduction angle $Ab$, of rectifier $P_{III,1}$ for a conduction angle $Ac$, again of these three rectifiers successively with gradually increasing conduction angles (for the sake of simplification FIG. 2 does not show the very great number of high frequency alternations during the period of gradual increase of the conduction angle), then to the succession of the operations of said rectifiers for a conduction angle equal to $$Ad=\frac{5\pi}{6}$$

and finally to the operations of the respective rectifiers $P_{I,1}$, $P_{II,1}$, $P_{III,1}$ with decreasing conduction angles $Ae$, $Af$, etc. As a matter of fact it is known that a controlled rectifier, for instance, of the solid thyratron type, is conductive as soon as a positive signal is applied to its control electrode such as 15, and that it remains conductive until its cathode voltage becomes higher than its anode voltage by the operation of another rectifier of the same group. For instance rectifier $P_{I,1}$ will cease to be conductive when it is no longer fed with the high frequency phase or when rectifier $P_{II,1}$ receives a positive signal upon its controlled electrode. This rectifier $P_{II,1}$ will in turn cease to be conductive at the end of the high frequency alternation or when a positive signal is applied on the control electrode 15 of rectifier $P_{III,1}$ and so on. At the end of the positive alternation, rectifiers $N_{I,1}$, $N_{II,1}$, $N_{III,1}$ cyclically enter into action with successive conduction angles analogous to those brought into play for rectifiers P.

Thus, it will be seen that, in order to distribute the energy within the alternations represented by the curve in dotted lines of FIG. 2, the conduction angle A must be compelled to vary according to a given law, in such manner that this angle, small at the beginning of an alternation, passes through a maximum at the time of full conduction and then decreases to zero. Therefore, supposing that, at every time, the phase angle of the output signal to be obtained is known, this angle being characterized by a "low frequency phase signal," the conduction angle of the high frequency phase is to be suitably controlled, this angle corresponding to a "high frequency phase signal."

Therefore, there is a law of variation of the high frequency conduction angle A as a function of the low frequency phase angle B, of the type $A=g(B)$ with $0<A<180°$ in the high frequency phase and $0<B<180°$ in the low frequency phase.

Figure 4:
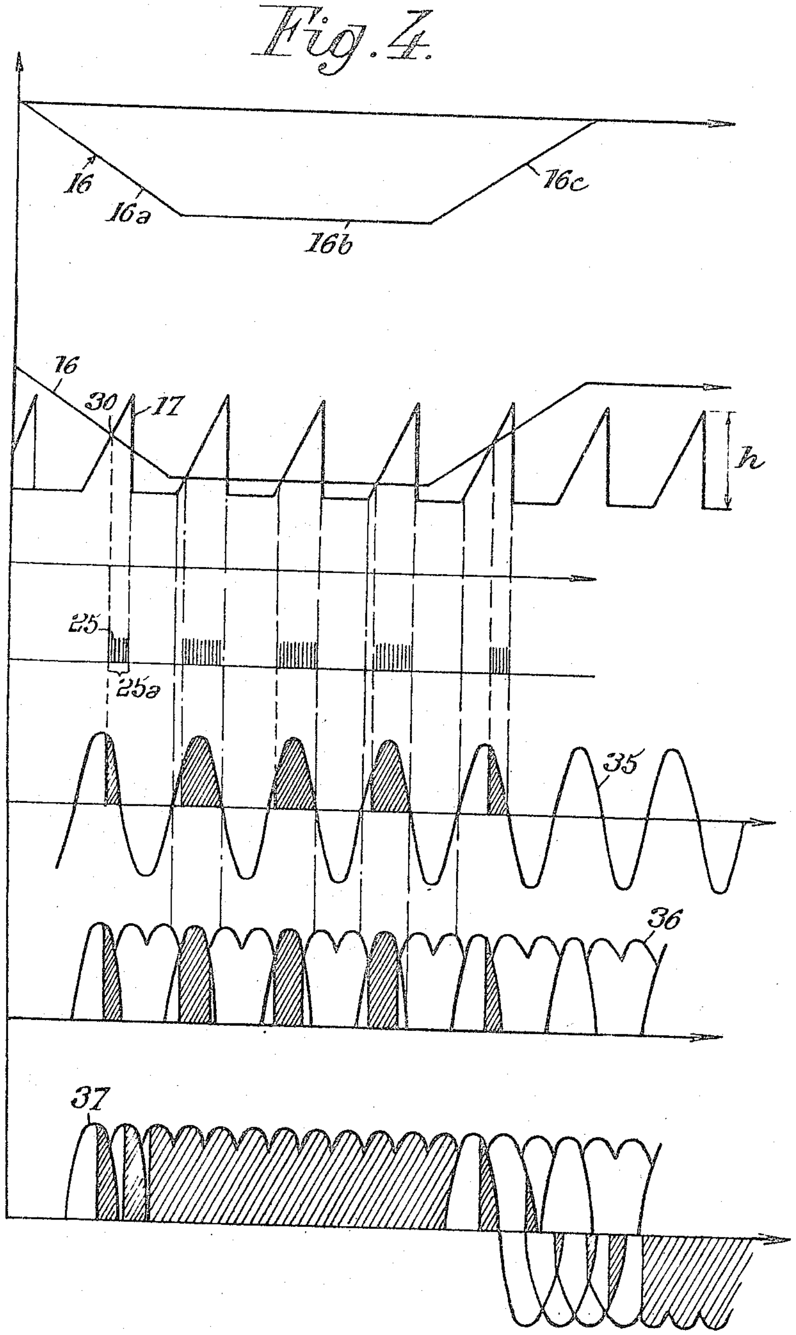
FIG. 4 shows the different waveforms of voltages brought into play in the device of FIG. 3.

In order to establish this law, there is provided, according to the main feature of the invention, a device for successively controlling rectifiers P, N adapted to cause them to feed current to every low frequency phase according to FIG. 2, this device comprising, for every phase, in combination, means (of the type illustrated by FIGS. 9 and 12 or 10 and 15) for producing a succession of signals of the type shown by 16, in FIG. 4, at the low frequency, these signals comprising, for every alternation and after polarity reversing, successively a decreasing portion 16*a* (increasing in absolute value), a substantially constant portion 16*b* and an increasing portion 16*b*, 16*c* (decreasing in absolute value), means of the type illustrated in FIG. 5 (FIGS. 7 and 8 showing two particular embodiments of the diagrammatic general arrangement of FIG. 5), for producing a succession of signals at the higher frequency consisting of saw teeth 17 of uniform amplitude $h$, a charging network 18 (FIG. 3) of the type including a resistor 19 and a capacitor 20, fed with the succession of signals 17 at the high frequency, and means, preferably consisting of a unijunction transistor 24, for comparing the two successions of signals 16 and 17, respectively, said last mentioned means being capable, every time the charge of said charging network 18, multiplied with a suitable proportionality factor and with the addition thereto of a given constant, reaches the instantaneous value of the low frequency signal 16, of discharging network 18 and of supplying a pulse 25 (FIG. 4) which serves to control a rectifier P or N (FIG. 3) corresponding to said phase, possibly through the intermediate of a controlled ignition rectifier 26.

The device for gradually controlling the rectifiers according to the invention is diagrammatically illustrated by FIG. 3. The higher frequency signals 17 are applied across points R and S, while the low frequency signals 16 are applied across X and Y. A contact polarizing current is applied across terminals D and J (D being positive with respect to J).

The operation of the device of FIG. 3 is as follows, referring to FIG. 4 which shows various waveforms and pulses used in the circuit of FIG. 3.

First the essential property of a single junction transistor will be reminded, to wit the fact that it becomes conductive between its two bases $B_2$ and $B_1$ when the voltage of emitter $E_0$ increases up to a value $U_E$ equal to $n$ times the voltage $U_B$ of the base $B_2$, that is to say when $U_E=nU_B$ ($n$, which is a number smaller than 1, is called the intrinsic ratio of the single junction transistor).

In particular, in the arrangement of FIG. 3, transistor 24 produces a pulse, such as 25, corresponding to the discharge of capacitor 20 into resistor 27 every time the voltage in charging circuit 18, and consequently in emitter $E_0$, reaches $n$ times the voltage of base $B_2$, that is to say the voltage at Y.

The signal applied on the charging network 18 is equal in the case of FIG. 3, to the sum of a portion $U_0$, available at G, of the fixed polarization voltage (applied across J and D), this portion depending upon the value of resistors 28 and 29, and of the high frequency phase signal 17. Therefore the voltage $U_s$ at point S is $U_S=U_0+kA$, $k$ being a constant.

If the time constant of the charging network 18 is chosen sufficiently small with respect to the period of the high frequency, which is $1/F$, the voltage across the terminals of capacitor 20, that is to say the voltage $U_E$ of emitter $E_0$, the origin being chosen equal to the potential of terminal J, is identical to $U_S$.

Considering now the low frequency phase signal 16 applied across X and Y and supposing that, initially, this signal 16 is zero (origin point in FIG. 4), the alternation of the low frequency signal that is produced being a negative alternation, the voltage $U_B$ of base $B_2$ is equal to the polarization voltage $U_P$, which is chosen in such manner that $n.U_B=n.U_P$, which is greater than $U_E$ maximum, which is equal to $U_0+kA$ ($U_E$ maximum representing the maximum value of $U_E$, above which a discharge takes place).

At the beginning of the positive alternation of the low frequency signal, the difference of potential between X and Y becomes positive. If $U_Z$ is this difference, $$n.U_B=n(U_P-U_Z)$$

this value being equal to $U_E$ for $$U_E=U_0+kA=n(U_P-U_Z)$$

Therefore it will be seen that the first pulse 25 of a series of such pulses is produced for a high frequency phase angle A such that $$U_0+kA=n(U_P-U_Z)$$

that is to say for $$kA=n.U_P-U_0-n.U_Z$$

that is to say for $$A=K-\frac{n}{k}\cdot U_Z$$

K being a constant.

This last mentioned formula gives the relation between A and $U_Z$. Consequently, if a law $A=g(B)$ is given, the relation $U_Z=g(B)$ can be deduced therefrom.

Therefore FIG. 4 shows that, when the value of the amplitude plotted in ordinates( the times being plotted in abscissas) of the succession of signals 17 reaches at point 30 the value taken at the same time by the amplitude of signal 16, unijunction transistor 24 becomes conductive across its bases $B_2$ and $B_1$ and therefore delivers a pulse 25 into resistor 27. Circuit 18 is very quickly recharged and the same operation takes place, sending another pulse 25 into resistor 27, and so on. There is therefore obtained, across the terminals of resistor 27, in particular at point 31, a train of pulses 25a corresponding to the chargings and dischargings of capacitor 20 during the time interval for which $U_E$ is greater than or equal to $n.U_B$.

The first of these pulses 25 is applied to the control electrode 32 of rectifier 26 which, fed with the high frequency phase through transformer 33 (the primary of which is disposed in the main line I) becomes conductive until the end of the positive high frequency alternation.

Ignition rectifier 26, which is now conductive, feeds current to the primary of transformer 34 the secondary of which is connected with the control electrode 15 of the main rectifier $P_{I,1}$ which then feeds current, through low-pass filter 21, into the charge resistor or load winding 11.

A similar arrangement is provided for controlling the other rectifiers $P_{II,1}$ and $P_{III,1}$ which feed current to conductor 1 and therefore to winding 11 during the positive alternations. Of course a similar arrangement is provided for feeding current to the controlled rectifiers $N_{I,1}$, $N_{II,1}$ and $N_{III,1}$ through low-pass filter 21.

Referring once more to FIG. 4, the lower portion thereof shows the cross-hatched areas corresponding to conduction of the ignition rectifier 26 (curve 35), the cross-hatched conduction areas for rectifier $P_{I,1}$ (curve 36) and finally (curve 37) the current applied to the low-pass filter 21 through the whole of the three rectifiers $P_{I,1}$, $P_{II,1}$, and $P_{III,1}$, and $N_{I,1}$, $N_{II,1}$ and $N_{III,1}$ connected therewith. The positive portion corresponding to rectifiers $P_{I,1}$, $P_{II,1}$ and $P_{III,1}$, can be easily deduced from curve 36, at the beginning of the positive alternation by gradual increase of the conduction angle, then by maintaining at the constant value $5\mu/6$ and by gradually reducing this angle at the end of this positive alternation. As for the negative alternation, it is deduced without difficulty from the positive alternation.

The means for obtaining the high frequency phase signals 17 and the means for obtaining the low frequency phase signals 16 will now be described.

Concerning first the means for obtaining the high frequency phase signals, they may include, as shown by FIG. 5 (which corresponds to only one phase), in combination with a tachometric dynamo 40 the rotor of which is driven in synchronism, either at the same speed or at a proportional speed, with the rotor of alternator 10, for instance from a shaft 38 (which is for instance the shaft of the turbo alternator or of the turbo jet engine of an aircraft), through the intermediate of bevel wheels 39, the following elements:

A peak limiter 41 which limits the top and bottom portions of waves 45a and 45b (FIG. 6) and transforms them into rectangular signals 46a or 46b of the same period $Ta$ or $Tb$;

A modulator 42 in which the tachometric voltage, which is a direct voltage the level of which is proportional to frequency F (in view of the fact that dynamo 40 and alternator 10 rotate at the same speed, or at respective speeds constantly proportional to each other, that the frequency delivered by the alternator is proportional to its speed and that the voltage of the dynamo is proportional to its speed), is chopped into square signals 47a or 47b, of amplitude $ha$ or $hb$ respectively, by modulating signals 46a or 46b. It can be seen that the width of signals 47a or 47b is proportional to period $Ta$ therefore inversely proportional to F whereas their height, which corresponds to the amplitude of the tachometric voltage, is proportional to F. Thus their area is independent of F and is consequently constant. The right hand and left hand portions of FIG. 6 correspond to two different frequencies F (having different respective periods $Ta$ and $Tb$) and it will be seen that the area of a signal 47a is equal to that of a signal 47b.

A resistor-capacitor integrator 43 which receives the rectangular signals 47a, 47b and which delivers, at its output, at the end of every half-period $Ta/2$ or $Tb/2$, a sawtooth signal 17 of constant amplitude $h$. It will be noted that the amplitude of the sawtooth signal in the increasing portion is exactly proportional to the high frequency phase angle if it is supposed that the charging of the capacitor is linear (which, in first approximation is the case at the beginning of the charging of a capacitor). In other words, system 40, 41, 42 and 43 is a device for converting the phase of alternator 10 into the amplitude of the signal 17 for a phase angle ranging from zero to 180°, and this whatever be the frequency and the voltage of the high frequency;

Finally an impedance adaptator circuit 44 disposed between the output of integrator 43 and the inlet impedance 48 of the next unit, that is to say between points R and S of FIG. 3.

In the embodiment of FIG. 7, which shows shaft 37, pinions 39, tachometric dynamo 40 and alternator 10, the elements are made as follows.

Peak limiter 41 consists of a resistor 49 and two Zener diodes 50, 51 which limit the amplitudes at the top and at the bottom;

Modulator 42 comprises a p-n-p transistor 52 mounted as an emitter-follower (this mounting corresponding to the cathode-follower mounting for triodes) which is alternately blocked and unblocked by peak limiter 41 so as to stop and to pass, respectively, the tachometric voltage $U_T$ supplied by dynamo 40 through resistor 53;

Integrator 43 comprises a capacitor 54 which is charged through a resistor 55, this resistor being short-circuited in the discharge direction by diode 56 in such manner that integrator 43 has a time constant which is relatively great for charging (when diode 56 is not conductive because it is biased in the opposed direction) and relatively small for discharging, which may take place through diode 56 the resistance of which is very low as compared to that of element 55. This permits of having a very short return period for saw teeth 17;

Finally the impedance adaptation circuit 44 consists of n-p-n transistor 57 mounted as an emitter-follower, this transistor having for its effect to reproduce under a small impedance across the terminals of resistor 48 (which represents the circuit of FIG. 3 between points R and S) the voltage across the terminals of capacitor 54.

The arrangement of FIG. 8 also includes a peak limiter 41 having a resistor 49 and diodes 50 and 51, and modulator 42 consisting of a p-n-p transistor 52 the base potential of which is adjustable by means of a potentiometer 58 from the tachometric voltage supplied by a dynamo 40.

As for integrator 43, it comprises a capacitor 54 which is charged, when transistor 52 (mounted in emitter-follower fashion) is unblocked and passes the tachometric voltage through diode 59, with a constant current for a given speed of rotation but which is a linear function of the speed of rotation of alternator 10, therefore of frequency F. As a matter of fact, when transistor 52 is conductive, the charge current is proportional to the voltage (uniform but adjustable) collected by the rider of potentiometer 58. The charging time of capacitor 54 is equal to one half of the period of the high frequency supplied by peak limiter 41 which, as shown by FIG. 8*a* (which shows the wave 45*c* supplied by alternator 10 and the wave 45*c* after clipping in wave limiter 41) unblocks transistor 52 for all the positive alternations of the high frequency.

The voltage V obtained across the terminals of capacitor 54 is given by the formula $$V=\frac{Q}{C}$$

Q being the charge of the capacitor and C the capacity thereof. Due to the charging under constant current, on the other hand, $Q=I.t$ (I being the uniform charging current and $t$ the time). Now, $I=K_1F$ and $$t_m=\frac{T}{2}=\frac{1}{2f}$$

($K_1$ being a constant and $t_m$ being the maximum duration of the charging). Finally $$V=\frac{Q}{C}=\frac{I\cdot t_m}{C}=\frac{K_1F}{CF\times 2}=\frac{K_1}{2C}=\text{a constant value}$$

Thus there is obtained both a perfect linearity of the charge of capacitor 54 and a constant maximum charge, as above indicated with reference to FIG. 6.

FIGS. 9 to 16 show two embodiments of the means for producing the low frequency signal. It is reminded that this signal 16 may be zero during the opposed alternation (for instance the negative alternation). It must increase in absolute value during the beginning of the alternation (portion 16*a*). It may remain constant or vary very little during the middle portion of the alternation (portion 16*b*), provided it operates controlled rectifiers such as P during a conduction angle greater than $5\pi/6$, thus ensuring full conduction. Finally it must decrease gradually in absolute value down to zero during the last portion of the alternation (portion 16*c*). This signal is illustrated at the top of FIG. 4.

The means capable of creating the low frequency phase signal comprise two successive units, to wit a unit for producing a low frequency reference signal and a unit which, starting from this reference signal produces the phase signal.

Two embodiments of each of these units are illustrated.

In the first embodiment, the low frequency reference signal is a sinusoidal signal produced in a device according to FIG. 9 and this signal is transformed, in the unit of FIG. 12, into the low frequency phase signal. In the second embodiment the reference signal consists of a pulse produced in the device of FIG. 10 and this pulse is transformed into the low frequency signal in the unit of FIG. 15.

The device of FIG. 9 comprises a sinusoidal oscillator 60 which supplies sinusoidal wave 61 at the low frequency $f$. This wave is sent, when the low frequency voltage is a three-phase voltage, into a phase shifting network 62 having three outputs 63*a*, 63*b* and 63*c* at 120° with respect to one another, in such manner as to obtain, at the output, three sinusoidal signals 64*a*, 64*b*, 64*c* (illustrated by FIG. 11) having a phase difference of 120° from one to the other. Each of these signals 64*a*, 64*b* 64*c* in the case of a three-phase low frequency voltage, or wave 61 in the case of a single phase low frequency voltage, constitutes a low frequency reference sinusoidal voltage which produces the low frequency phase signals in the unit of FIG. 12.

In the unit of FIG. 10, there is provided a relaxation oscillator 65 which delivers pulses 66 at a frequency equal to $6f$ in the case of a three-phase low frequency voltage, or pulses 66 at a frequency equal to $2f$ in the case of a single phase low frequency voltage. A logical network 67 (for instance of the type including electronic trigger circuits) counts and distributes the pulses 66 to the outputs 68*a* 68*b*, 68*c* (in the case of a three-phase low frequency voltage) by delivering pulses 69*a*, 69*b*, 69*c* which acts as references for the three phases of the three-phase network according to the following cycle visible on FIG. 11.

1st pulse (69*a*) beginning of +alternation of phase 1;
2*nd* pulse (69*c*) beginning of −alternation of phase 3;
3rd pulse (69*b*) beginning of +alternation of phase 2;
4th pulse (69*a*) beginning of −alternation of phase 1;
5th pulse (69*c*) beginning of +alternation of phase 3;
6th pulse (69*b*) beginning of −alternation of phase 2.

On the contrary in the case of a single phase low frequency voltage, pulses 66, at frequency $2f$, are sent to a single output, to wit a first pulse at the beginning of the positive alternation and a second pulse at the beginning of the negative alternation in every period $1/f$.

The reference sinusoidal signals 64 of FIG. 11 produced in the unit of FIG. 9 (or wave 61 in the case of a single phase low frequency voltage) are used in units of the type illustrated by FIG. 12 (a unit for every signal or low frequency phase). Each unit comprises two pairs of diode rectifiers 70*a*–70*b* and 71*a*–71*b*, for the two alternations of a signal 64*a*, 64*b*, 64*c* (or 61). FIG. 12 merely shows the portion of the circuit corresponding to the positive alternations of the phase that is considered, the portion corresponding to the negative alternations of this phase being analogous.

A positive half-wave 64 serves to charge a charging circuit comprising a resistor 72*a* and a capacitor 73*a* (for the negative half-wave there is an analogous charging circuit 72*b*–73*b*). This charging circuit introduces a delay to charging and also the discharging circuit, due to the time constant of the circuit. It follows that every positive half-wave 64 is transformed into a non-symmetrical positive signal 74 the top of which is cut off to give a signal 74*a*

(as shown by FIG. 14 whereas the top portion of the signal 64 of FIG. 13 is not clipped) if it extends above a given level *m* adjustable by acting upon the adjusting slider of potentiometer 76. Transistor 77 receives, into the base-emitter space in series with a potentiometer 78, the difference between signal 74 (FIG. 13), or the clipped signal (FIG. 14), and a threshold adjustable by means of potentiometer 79, the amplification of the transistor being itself adjustable by means of a potentiometer 78. The amplified output signal, such as **16*d* in the case of FIG. 13 where there is no clipping or 16*e* in the case of FIG. 14 where there is a clipping, is available on the one hand across the terminals of resistor 80 and on the other hand across the terminals of resistor 81. A transistor 82 ensures an adaptation of impedance with a gain equal to 1 in such manner that across the terminals of the two resistors 80 and 81 there is obtained the same low frequency signal 16*d* or 16*e*, as shown by FIGS. 13 and 14, respectively. This signal, after polarity reversal, gives a signal 16** of the type shown by FIG. 4, that is to say comprising a downward portion (upward in absolute value), a substantially constant portion and an upward portion (downward in absolute value).

Finally, FIGS. 15 and 16 indicate how it is possible to obtain, from pulses 69, low frequency phase signals.

The device shown by FIG. 15 successively comprises a monostable multivibrator 83 which is started into operation for every pulse 69 to pass from its stable state to its non-stable state where it remains for a time determined by the characteristics of its elements. Then it returns to its stable state. During the whole time multivibrator 83 remains in its non-stable state, it emits a voltage signal 84 of a duration smaller than, or equal to, one-half of a low frequency period, that is to say $1/2f$. The voltage signal 84 is applied to an integrator 85 which is therefore linearly charged, giving a sawtooth 86 for every signal 84. This sawtooth is clipped at level $m_1$ by a limiter 87 which finally supplies, in response to every pulse 69, a signal **16*f* analogous to the signal 16*e* of FIG. 14 (it comprises an upward portion, an horizontal portion and a downward portion). By reversing signal 16*f*, there is obtained a signal of the type 16**, FIG. 4.

It will be noted that the pulse system (FIGS. 10 and 15) is more advantageous when it is desired to lower the frequency of two or several alternators 10 because it is possible to ensure synchronism of the low frequency voltages that are obtained. On the contrary, the sinusoidal oscillation system (FIGS. 9 and 12) is simpler and is more advantageous when the installation, in particular an aircraft, comprises a single alternator 10.

The preceding description has considered only the case of a device transforming a high voltage of variable frequency into a low voltage of constant frequency. In the contrary case, that is to say when the high frequency is constant and the low frequency is variable, the variable low frequency serving for instance to control universal motors without filtering units 21, 22 and 23 or with simplified filtering units, it is possible to use an arrangement much simpler than that of FIGS. 5, 7 and 8 to produce the high frequency phase signal, that is to say a phase-amplitude converter. It suffices, in this case, to make use of a diode-inductance-resistor series network fed from the high frequency. As a matter of fact such a network supplies a sawtooth signal the slope of which depends upon the high frequency and frequency voltage. This characteristic, which is very disturbing in the case of a variable high frequency has no drawback in the case of a fixed high frequency. This is why it is of interest to use it in this last case due to the fact of its great simplicity.

A frequency reducing device according to the invention has over the existing devices of the same type many advantages, and in particular the following ones.

First it permits of obtaining from a three-phase frequency with great variations, a substantially constant low frequency and this exclusively with elements in the solid state, that is to say strong, reliable, having a long life and requiring little current under a very low voltage.

The low frequency voltage that is obtained is substantially sinusoidal.

Finally the efficiency is very good.

Of course the above described embodiments have been given merely by way of example. It would be possible to use other comparator systems (for instance including two or several resistors of conventional type) or other control rectifiers (for instance gas thyratrons or transistors working as switches).

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A frequency changer for changing a high frequency alternating polyphase input current supplied from a generator and flowing through a first circuit into a low frequency alternating output current flowing through a second circuit, said frequency changer comprising:
  - a plurality of pairs of rectifiers, the two rectifiers of each pair, in opposition with each other, being disposed between one phase of said first circuit and said second circuit, said rectifiers including gate control means for making them conductive for periods that go increasing during a first portion of every alternation of said output current, then remain at a maximum value during the middle portion of said alternation and go decreasing during the last portion of said alternation,
  - means for producing a succession at said low frequency of voltage signals each comprising successively, for every alternation, an increasing voltage portion, a substantially constant voltage portion and a decreasing voltage portion, in absolute value,
  - means operative by said generator for producing a succession at said high frequency of voltage signals consisting of saw teeth of constant amplitude,
  - a charging network of the resistor-capacitor type fed from said last mentioned means with the succession of high frequency signals, and
  - in each phase a single unijunction transistor having inputs connected with the output of said first mentioned means and with the output of said network for comparing the signals from said outputs and having an output connected to said gate control means capable, every time the charge of said network reaches a value which is in a given linear relation to the value of the low frequency signal at the same time, of discharging said charging network and of feeding a pulse to said gate control means.

2. A frequency changer for changing a high frequency alternating three phase input current supplied from a generator and flowing through a first circuit into a fixed low frequency alternating three phase output current flowing through a second circuit, said low frequency being lower than the lowest value of said high frequency, said frequency changer comprising:
  - nine pairs of rectifiers, the two rectifiers of each pair, in opposition with each other, being disposed between one phase of said first circuit and one phase of said second circuit, said rectifiers including gate control means for making them conductive for periods that go increasing during a first portion of every alternation of said output current, then remain at a maximum value during the middle portion of said alternation and go decreasing during the last portion of said alternation,
  - means for producing in each phase of said second circuit a succession at said fixed low frequency of voltage signals each comprising successively, for every alternation, an increasing voltage portion, a substantially constant voltage portion and a decreasing voltage portion, in absolute value, means operative by said generator for producing in each phase of said first circuit a succession at said high frequency of voltage signals consisting of saw teeth of constant amplitude, a charging network of the resistor-capacitor type fed from said last mentioned means with the succession of high frequency signals, and in each phase a single unijunction transistor having inputs connected with the output of said first mentioned means and with the output of said network for comparing the signals from said outputs and having an output connected to said gate control means capable, every time the charge of said network reaches a value which is in a given linear relation to the value of the low frequency signal at the same time, of discharging said charging network and of feeding a pulse to said gate control means.

3. A frequency changer according to claim 2 comprising an alternator for delivering said high frequency three phase current and wherein said means for producing a succession of signals at said high frequency comprise a tachometric dynamo operatively connected with said alternator so that the speeds of rotation of said dynamo and said alternator are proportional, respectively, a peak limiter connected with said alternator to clip the top and bottom portions of the sinusoidal signals produced by every phase of said alternator, a modulator connected both with said peak limiter and with said tachometric dynamo and wherein the tachometric voltage proportional to the speed of the alternator is chopped by the clipped signals supplied by the peak limiter to produce square signals of a width inversely proportional to said high frequency and of a height proportional to said high frequency, and an integrator having its input connected with the output of said modulator and capable, in response to the signals received by it from said modulator, of delivering saw teeth of constant maximum amplitude and the amplitude of which during the increasing amplitude period is proportional to the high frequency phase angle.

4. A frequency changer according to claim 2 wherein the means for producing a succession of signals at said fixed low frequency comprise a sinusoidal oscillator working at said low frequency to supply an initial sinusoidal signal, a phase shifting network connected with the output of said oscillator and having three outputs for delivering at said respective outputs three sinusoidal signals in phase difference of 120° from one another, two opposed rectifier circuits connected with each of said last mentioned outputs, a resistor-capacitor charging circuit having its input connected with the output of each rectifier circuit, this charging circuit being adapted to transform, due to its time constant, every alternation fed by the rectifier circuit to which it is connected into a non-symmetrical signal, a peak limiter for clipping said non-symmetrical signal if it extends above a given level in absolute value, an amplifier for amplifying the non-symmetrical signal and means for reversing the polarity of the signal thus amplified.

5. A frequency changer according to claim 2 wherein the means for producing a succession of signals at said fixed low frequency comprise a relaxation oscillator capable of delivering a succession of pulses at regular intervals at a frequency which is equal to six times said low frequency, three outputs of a logical network interposed between said oscillator and said outputs for distributing the succession of pulses delivered by said relaxation oscillator cyclically and successively to said three outputs, each of said outputs receiving, at the beginning of every positive alternation and at the beginning of every negative alternation at the low frequency, a pulse of this succession, one monostable multivibrator for every alternation of every low frequency phase, a pair of said multivibrators being connected to each of said outputs so that every multivibrator is started by every pulse of the corresponding phase and polarity of said succession of signals to shift from its stable state to its non-stable state in which it remains for a time at most equal to one-half of the period of the low frequency, thus emitting a voltage signal, an integrator connected with each of said monostable multivibrators so as to be charged successively by the voltage signals emitted therefrom and to deliver a succession of saw teeth, a limiter branched to the output of each of said integrators for limiting the saw teeth that come out therefrom to a given level and means for reversing the polarity of the succession of clipped saw teeth issuing from said limiter.

6. A frequency changer according to claim 2 further comprising, between each of said rectifiers and the corresponding transistor, a controlled ignition rectifier capable when conductive of applying an unblocking current on the control electrode of said last mentioned rectifier.

References Cited

UNITED STATES PATENTS

| | | | |
|---|---|---|---|
| 2,442,257 | 5/1948 | Boyer | 321—61 |
| 2,683,851 | 7/1954 | Parsons | 321—7 |
| 2,854,617 | 9/1958 | Johnson | 322—32 |
| 3,152,297 | 10/1964 | Peaslee | 321—61 |
| 3,256,244 | 6/1966 | Byloff et al. | 321—61 |

JOHN F. COUCH, *Primary Examiner.*

G. GOLDBERG, *Assistant Examiner.*